United States Patent [19]

Filippov et al.

[11] 4,011,165

[45] Mar. 8, 1977

[54] HIGH FREQUENCY OZONIZER

[76] Inventors: Jury Vasilievich Filippov, Leninskie gory, MGU, korpus M, kv. 159; Vsevolod Petrovich Vendillo, ulitsa Panferova, 11, kv. 99; Nikolai Alexandrovich Ox, Michurinsky prospekt, 54, korpus 2, kv. 85, all of, Moscow, U.S.S.R.

[22] Filed: July 31, 1975

[21] Appl. No.: 600,862

[52] U.S. Cl. ............................................. 250/540
[51] Int. Cl.² ....................................... C01B 13/11
[58] Field of Search ........................... 250/532–541

[56] References Cited

UNITED STATES PATENTS

| | | | |
|---|---|---|---|
| 830,975 | 9/1906 | Dechaux | 250/540 X |
| 1,201,379 | 10/1916 | Steynis | 250/540 |
| 1,512,285 | 10/1974 | Hartman | 250/540 |
| 2,010,081 | 8/1935 | Hartman | 250/540 |

*Primary Examiner*—Anthony Skapars
*Assistant Examiner*—Aaron Weisstuch
*Attorney, Agent, or Firm*—Haseltine, Lake & Waters

[57] ABSTRACT

A high frequency tubular ozonizer in which low voltage and high voltage electrodes are coaxially disposed metal pipes. The high voltage electrode is made detachable, and a portion of the electrode disposed in a discharge gap, is coated with a dielectric. The low voltage electrode is cooled directly with a coolant flow. The ozonizer has a reliable centering device, due to which the low voltage and high voltage electrodes can be easily arranged coaxially. Low and high voltage units, in the ozonizer, can be easily assembled or taken apart. To increase the operating capacity ozonizers can be either coupled by means of common pipelines to form multielement installations or they can be coupled in a common housing.

3 Claims, 6 Drawing Figures

HIGH FREQUENCY OZONIZER

BACKGROUND OF THE INVENTION

The present invention relates to a process of ozone production and, more specifically, to high frequency ozonizers.

Ozone is a very important product having a wide range of application in various branches of industry. For example, ozone can be used for the purification of potable water and industrial effluents, and for the removal of nitrogen oxide and other toxic gases from the environment. Ozone can also be used in various branches of chemical production, for example in chemical production processes based on organic and non-organic chemicals, in metallurgy etc.

Known installations for the synthesis of ozone comprise a dielectric in the discharge gap thereof. In accordance with the type of system used for cooling the dielectric, these installations are subdivided into installations without intensive cooling of the dielectric, preferably having an air-cooled dielectric, and installations having an intensive liquid cooling system. The installations without intensive liquid cooling are intended for operation at frequencies of 50–60 Hz. The working capacity of such ozonizers is comparatively low. The installations having an intensive liquid cooling system for the dielectric are capable of operating at increased frequencies of about 1000 Hz and have a higher working capacity which can be further increased in proportion to the frequency.

Known in the art are a number of embodiments of ozonizers having a liquid cooling system for both electrodes.

These ozonizers have a common housing and comprise coaxially arranged tubular metal low voltage and high voltage electrodes. The conjugate surfaces of said electrodes, coated with a dielectric, form a discharge gap in which the electric discharge and the ozone generating reaction take place. The low voltage electrodes are cooled with a flow through of cooling liquid, which flows through the space formed by the housing and the low voltage electrode. The high voltage electrodes are cooled with a flow through of gas or liquid coming into the tubular spaces between the electrodes from the input manifold. This gas or liquid is then discharged from said spaces into the output manifold, which is analogous to the input manifold, provided the cooling liquid does not cause a short circuit between the low voltage and high voltage electrodes.

The main disadvantage of this embodiment of an ozonizer is the complexity of replacement of faulty electrodes.

Another embodiment is an ozonizer comprising a housing with low voltage and high voltage electrodes coaxially arranged therein.

The low voltage electrode consists of a metal pipe with a dielectric attached to its inner surface, and a metal tubular casing. The space formed by the casing and the metal pipe is provided with corrugated metal.

The high voltage electrode is closed at one end and is rigidly secured to a high voltage insulator. The space formed by the conjugate surfaces of the dielectric of the low voltage electrode and the metal surface of the high voltage electrode, form a discharge gap in which ozone generating reaction takes place.

The low voltage electrode is cooled by a liquid which flows in the space formed by the casing of the electrode and the housing of the ozonizer. Heat from the dielectric is removed through a metal pipe secured on the dielectric and also through the metal corrugations. The casing of the high voltage electrode, as well as the housing, is fastened between the end covers of the ozonizer.

The high voltage electrode has no direct flow through cooling. The inflow of the cooling liquid is provided through a special pipe arranged along the axis of the electrode. The ozonizer is cooled by oil supplied to the electrodes by a special pump.

It should be noted that the above system provides inadequate cooling of the dielectric. This is a result of the heat from the dielectric being discharged through the metal corrugations. The heat dissipating surface of these corrugations is small since the metal pipe secured on the dielectric has no direct contact with the cooling liquid.

The degree of cooling of the high voltage electrode is also inadequate, owing to the low flow velocity of the cooling liquid along the surface of the electrode. This liquid is oil rather than water.

Known in the art is another embodiment of a high frequency ozonizer, wherein several ozonizing elements, consisting of glass low voltage and metal high voltage tubular electrodes, are secured in a common metal casing. The conjugate surfaces of these electrodes form a discharge gap in which the ozone generating reaction takes place during electric discharge.

The low voltage electrodes are cooled directly with a flow of liquid, preferably water, flowing in the space formed by the casing of the ozonizer and the surfaces of the electrodes. The high voltage tubular electrodes, having varying cross-sections, are mounted in manifolds through which the cooling liquid is supplied and removed. The coolant, which may be water, is supplied to the manifolds and removed from these manifolds through long pipelines made of a dielectric material. The manifolds are secured to the bottom of the ozonizer casing by means of cylinder-shaped gas chambers.

We must point out the complexity of centering the many high voltage electrodes in the ozonizer relative to the low voltage electrodes. This centering is required to provide for an even discharge gap along the whole length of the ozonizing element. Since the electrodes are secured in the manifolds, it is necessary to center the manifolds relative to the ozonizer casing. Besides, the dismantling of the ozonizer for repair or for replacing the dielectric is a rather complicated procedure.

The object of the present invention is to provide a high-frequency, high capacity ozonizer having metal electrodes coated with a dielectric, which may be easily dismantled into high voltage and low voltage units. Such a feature considerably simplifies the mounting and dismantling of the ozonizer for preventive inspection and repair.

SUMMARY OF THE INVENTION

This and other objects are achieved in a high frequency ozonizer having a housing containing coaxially arranged tubular low voltage and high voltage electrodes. The conjugate surfaces of these form a discharge gap, in which gap at least one of the electrodes is coated with a dielectric. The high voltage electrode is secured to the housing by means of a high voltage insulator and cooled with a cooling liquid supplied to the inner surface of the electrode through a pipe arranged along the axis of the housing. According to the present invention, the high voltage electrode is embodied as a detachable element, consisting of two parts. One of these parts is disposed in the high voltage insulator, whereas the other is butted with the first part and is made from a metal coated with a dielectric or from a dielectric. The latter is arranged in the discharge gap and provided with a centring device from the free end side thereof.

In the high frequency ozonizer, according to the invention, the centering device is preferably embodied as an end cup covering one end of the pipe used for supplying the liquid cooling the high voltage electrode, and, a stop, having a clamp covering the free end of the other part of the high voltage electrode and having a nut screwed thereon, which rests upon a centering thrust journal. One end of the high voltage electrode is mounted on this thrust journal, thereby providing for centering of the high voltage electrode along the axis of the low voltage electrode. The ends of the low voltage electrode must be rounded. This feature makes it possible to avoid edge effects and dielectric break-down.

BRIEF DESCRIPTION OF THE DRAWINGS

The proposed invention is further explained by illustration of an embodiment of this invention with reference to accompaning drawings, in which.

DESCRIPTION OF THE PREFERRED EMBODIMENTS

Figure 1:
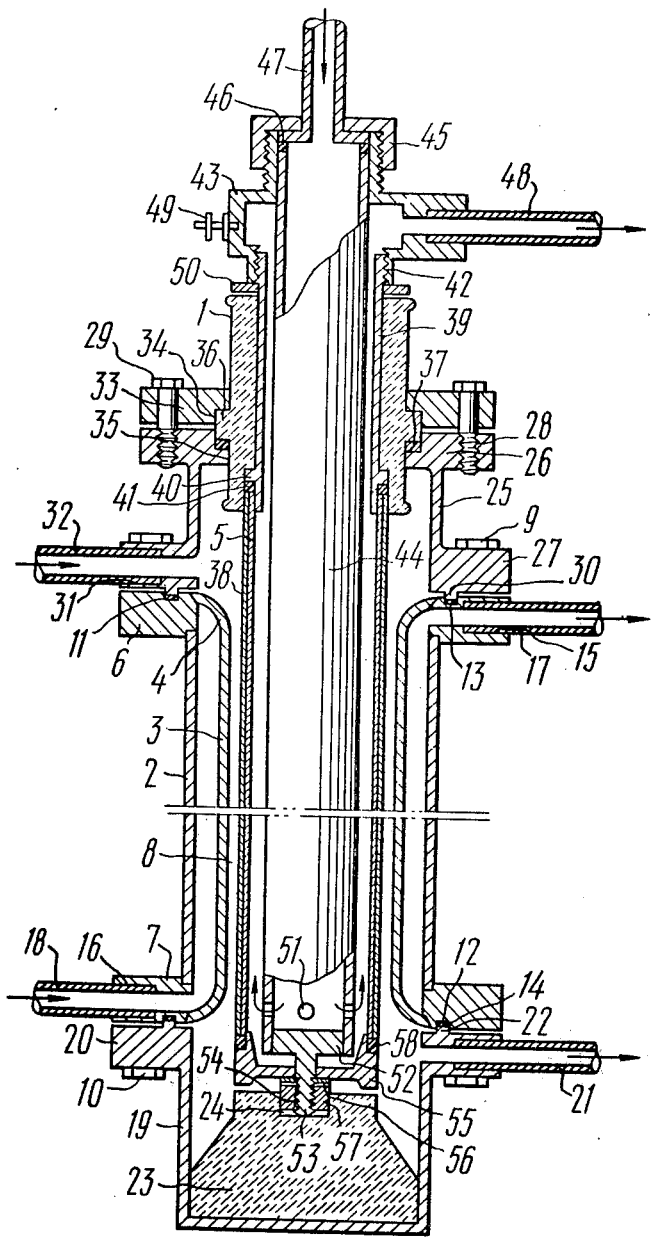
FIG. 1 shows a longitudinal section of the proposed high frequency ozonizer comprising one ozonizing element, according to the invention.
Figure 2:
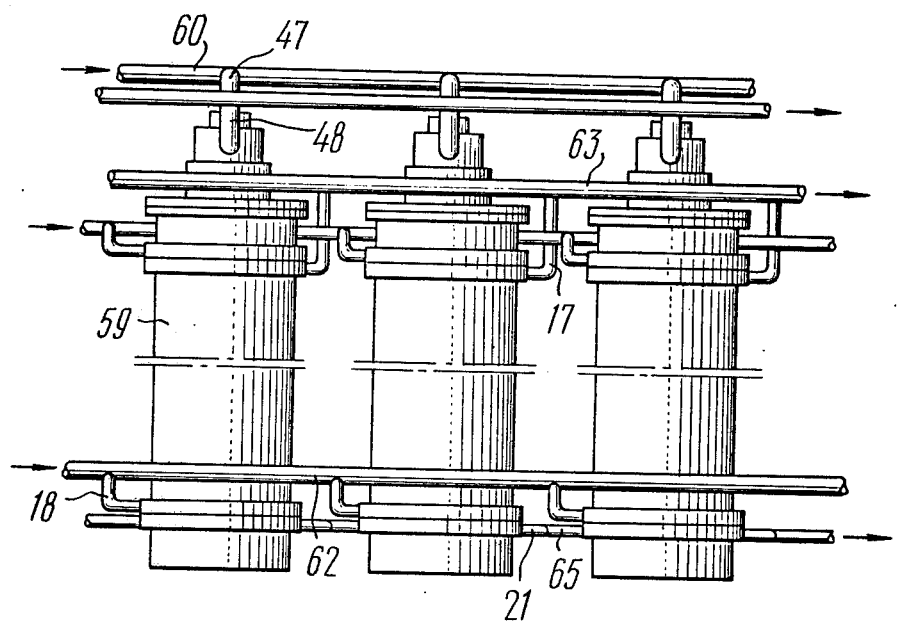
FIG. 2 shows a lateral view of an arrangement for coupling the unielement ozonizers with the help of pipelines to form a multielement installation of the proposed high frequency ozonizer, according to the invention.
Figure 3:
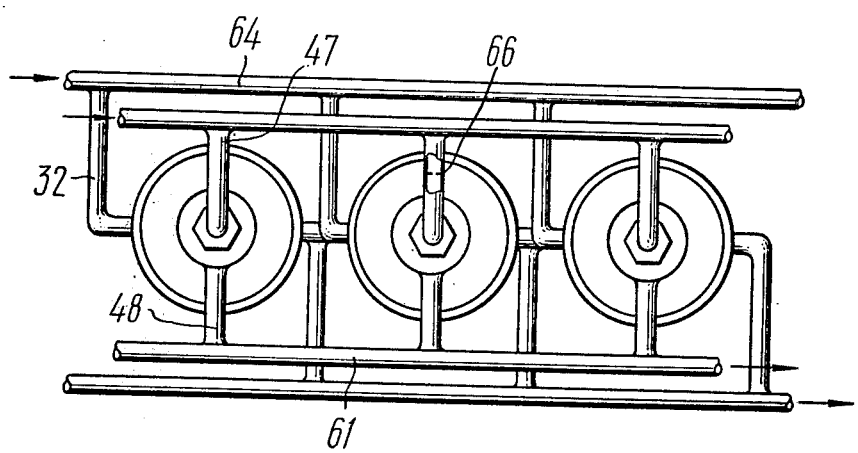
FIG. 3 shows a top view of scheme for coupling the unielement ozonizers, with the help of a pipeline, to form a multielement installation of the proposed high frequency ozonizer, according to the invention.
Figure 4:
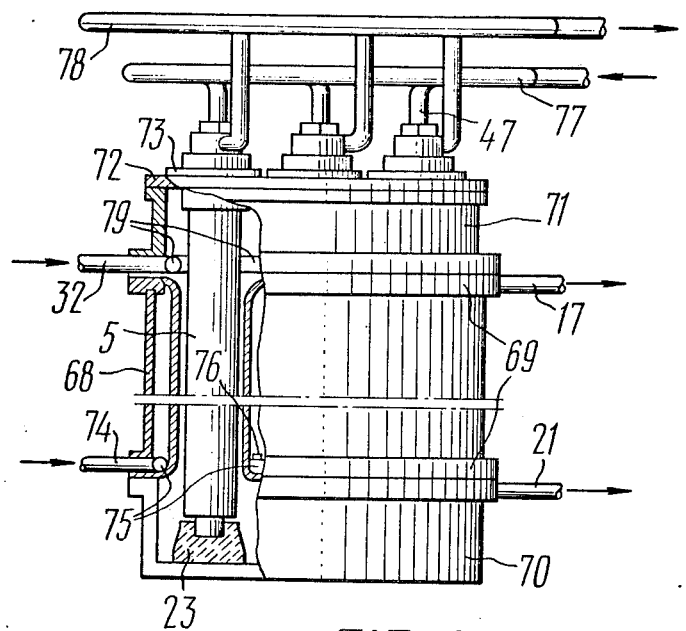
FIG. 4 shows a lateral view of a scheme for a high frequency ozonizer comprising seven ozonizing elements in a common housing, according to the invention.
Figure 5:
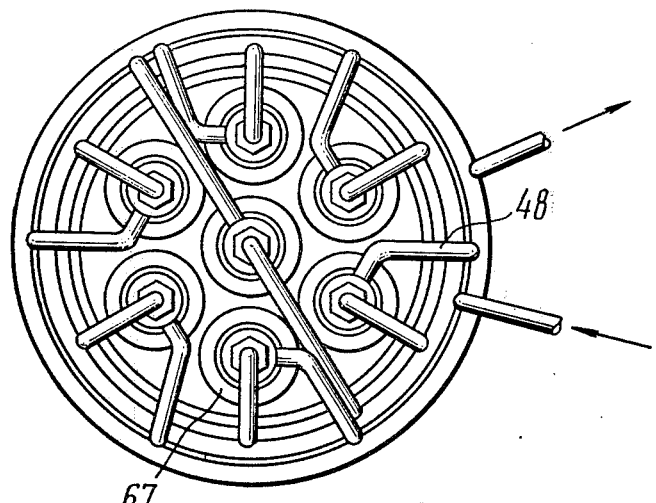
FIG. 5 shows a lateral view of a scheme for a high frequency ozonizer comprising seven ozonizing elements, according to the invention.

The high frequency ozonizer, according to the invention, can be embodied as one ozonizing element, as shown in FIG. 1. Another embodiment of a high frequency ozonizer, comprising three ozonizing elements and connected by means of common pipelines, is shown in FIGS. 2, 3. Still another embodiment of a high frequency ozonizer, comprising seven ozonizing elements in a common cylindrical housing, is shown in FIGS. 4, 5.

However, it should be noted that the number of the ozonizing elements can be increased or decreased depending on the required output. The arrangement of the elements and the shape of the housing can also be arbitrary.

Each ozonizing element of the high frequency ozonizer consists of high voltage and low voltage units. These said units are separated by a high voltage insulator 1 (FIG.1).

The low voltage unit of the ozonizing element comprises a cylindrical housing 2, and a metal cylindrical low voltage electrode 3 having rounded ends 4. The surface of the electrode facing the high voltage electrode 5 can, if desired be coated with a dielectric. The rounding of the profile of ends 4 of the low voltage electrode 3 is required to prevent dielectric breakdown and to eliminate edge effects. The housing 2 and the electrode 3 are welded to coupling flanges 6 and 7. The space between the high voltage electrode 5 and the low voltage electrode 3 is the discharge gap 8, the electric discharge taking place therein.

Along the perimeter of the coupling flanges 6 and 7 there are provided openings (these openings are not shown in FIG. 1), accomodating retaining bolts 9 and 10. There are also O ring grooves 11 and 12 accomodating ozone-resistant cover gaskets. The butt ends of the flanges are provided with bored-out cavities 15, 16, wherein the branch pipes 17 and 18 are sealed and secured. These branch pipes are used for admission and discharge of liquid cooling the low voltage electrode 3. The low voltage unit has a cylindrical metal base 19, one side of which is fastened to the coupling flange 7, with the help of flange 20. Holes are provided along the perimeter of flange 20 (not shown in FIG.1) for bolts 10. The butt end is provided with an opening for securing the branch pipe 21 through which the ozonized gas is discharged. The surface of flange 20 facing the coupling flange 7 of the housing 2, has a ring shaped projection 22 intended to mate through the ozone-resistant gasket 14 with the respective groove 12 of the coupling flange 7. Inside the base 19 there is secured a centering journal 23 made from an insulating and ozone-resistant material and having a recess 24 along the axis of the high voltage electrode 5 for centering the high voltage electrode 5.

In addition, the low voltage unit has a cylindrically-shaped cup 25, made from metal or from an insulating and ozone-resistant material. The cup 25 is provided with flanges 26 and 27, along the perimeter of which there are provided openings 28 accomodating the retaining bolts 9 and 29. The surface of flange 27 facing the coupling flange 6 of housing 2 is provided with a ring shaped projection 30, which mates with the respective groove 11 of the coupling flange 6 via an ozone resistant gasket 13. The butt end of flange 27 of cup 25 is provided with a bored cavity 31 for securing branch pipe 32; oxygen or a gas containing oxygen is admitted through this pipe. The cup is closed with a cover 33 with the help of bolts 29 arranged along the perimeter of the cover. The cover 33 and the flange 26 along the axis thereof have central openings 34 and 35, wherein the high voltage insulator 1, together with the high voltage unit are rigidly fastened to the free side of cup 25 with the help of the flange 36 and ozone-resistant cover gasket 37.

The high voltage unit has a tubular detachable high voltage electrode comprising two parts, a lower part 5 which is made of metal having a dielectric coating 38, for example silicate enamel (or a dielectric, for example glass) and is disposed in the high voltage insulator 1. The upper part or cap 39 is provided from one side thereof with a flange 40. The high voltage electrode 5 is butted through an ozone-resistant cover gasket 41 to this flange. The other side of the cap 39 is provided with a thread 42 for coupling with a tee 43. The tubular metal tee 43 is provided, on the inner surfaces of opposite ends thereof, with a thread for securing cap 39 from one side and for securing pipe 44 from another side. This pipe is used to supply the cooling liquid into the interior space of the high voltage electrode 5, whereas along the outer surface of the tee 43 and from the end of said tee to which the pipe is fastened, there is provided a thread, by means of which branch pipe 47, through which the cooling liquid is supplied, is fastened with the help of a nut 45 and is sealed with the help of a gasket 46. The lateral pipe of the tee is provided with a cavity for the fastening and sealing of branch pipe 48, through which the cooling liquid is discharged from the high voltage electrode.

In the middle portion thereof the tee is provided, with a clamp 49. A wire for supply of electric current is connected to this clamp.

The cap 39, with the help of flange 40 from one side thereof and with the help of metal washer 50 and the tee 43 screwed on the cap 39 from the other side thereof, is rigidly fastened in the high voltage insulator 1.

The metal pipe 44 is provided with a thread and with openings 51 for discharging the cooling liquid into the interior space of the high voltage electrode 5 at the lower end thereof. The end of pipe 44 is closed with a cap 52. The cap 52 is provided with a stop having a thread 54. The stop 53 also has a clamp 55 and an ozone-resistant gasket washer 56, both placed freely on said stop, and a nut 57 screwed on said stop. With the help of nut 67 the high voltage electrode 5 is sealed by means of an ozone-resistant gasket 58 and is rigidly joined to the upper part thereof, i.e. with the cap 39.

The stop 53 and the nut 57 are fitted into a recess 24 provided in the centering journal 23. This results in the coaxial arrangement of high voltage electrode 5 and low voltage electrode 3, i.e. resulting in the centering of the electrodes.

To increase the output of the ozonizer the ozonizing elements are coupled to form high frequency multitubular ozonizers, as follows.

For example, several unielement ozonizers can be coupled directly through pipelines used for cooling liquid and gas. An example of such coupling of three ozonizers is shown in FIGS. 2, 3.

The liquid cooling the high voltage electrodes 5 is supplied and distributed through branch pipes 47 connected with a pipeline 60. This pipeline is common for all the ozonizers, whereas said liquid is discharged through branch pipes 48 connected to a common pipeline 61, providing the pipelines are made of a dielectric material. The arrangement of the pipelines 60 and 61, and coupling thereof with respective branch pipes 47, 48 of the ozonizers, does not impede dismantling of the high voltage units.

The liquid cooling the low voltage electrodes 3 is supplied and distributed through branch pipes 18 connected to a common pipeline 62. This liquid is discharged through branch pipes 17 connected to a common pipeline 63.

To ensure an even flow of liquid and gas through the unielement ozonizers the inlet branch pipes 18, 32, 47 must each be provided with built-in diaphragms 66. High voltage is fed to each ozonizing element separately through a fuse or through a circuit breaker (not shown in FIG. 1), which cuts the high voltage off in case of dielectric break down. FIGS. 4, 5 show one more example of embodiment of an ozonizer comprising seven ozonizing elements 67 in a common housing 68. The housing 68 is connected by means of flanges 69 and retaining bolts (not shown) with a common base 70 and a common upper cup 71. The centering journals 23 are arranged along the axis of separate ozonizing elements on the bottom of base 70. The cup is closed with a cover 72 having openings (not shown in FIG. 4) for fastening the high voltage insulators 1 of separate ozonizing elements, fixed on the cover 72 with special washers 73 and bolts (not shown in FIG. 4).

The low voltage electrodes are cooled with water supplied through a branch pipe 74 into a ring-shaped manifold 75 having diaphragms 76 providing for even distribution of the flow of water, which is admitted to housing 68 and is discharged from there through a branch pipe 17.

The high voltage electrodes are cooled with water coming in through long pipelines, made from a dielectric material, to a ring-shaped manifold 77, also made from a dielectric material. From this manifold the water flows along branch pipes 47 into the interior space of high voltage electrodes 5. These branch pipes have built-in diaphragms 76 providing for the even distribution of water. The water is discharged from the high voltage electrodes through branch pipes 48 into a ring-shaped manifold 78 connected to a long pipeline made from a dielectric material. Oxygen or a gas containing oxygen is supplied through the branch pipe 32 to a ring-shaped manifold 79. This manifold has diaphragms 76, through which the oxygen flows into the discharge gap of the ozonizing elements and is discharged through the branch pipe 21 which is disposed in the base 70.

If the installation comprises three ozonizers coupled directly, the high voltage is supplied as described above. The cup can be made not only from a metal but also from a dielectric. The high voltage unit can also be fastened directly to the cover 72 of he cup 71, because in this case the high voltage insulators are not required.

The embodiment of the high frequency ozonizer provides for dismantling for protective inspection and repair of units or for replacing the high voltage electrode 5, if said electrode is rendered inoperable.

The dismantling of the ozonizer is effected by disconnecting the branch pipes 47 and 48 from the pipelines which are used for supplying the liquid used to cool the high voltage electrode, by then disconnecting the high voltage electrode from the clamp 49 (FIG. 1) then unscrewing the retaining bolts 29 and removing the high voltage unit together with the insulator 1. After this procedure the high voltage electrode 5 is easily accesible for preventive inspection.

In case of a breakdown or other defect the high voltage electrode 5 can be replaced. The replacement is effected by unscrewing the nut 57, (FIG. 1) and removing first the clamp 55 and then the electrode 5. To re-assemble the high voltage electrode 5, the same steps must be taken in reverse order. This procedure provides for the simultaneous self-centering of the high voltage electrode owing to the fact that the throw-out stop 53 enters the recess 24 of the centering journal 23. If badly damaged, the high voltage unit can be replaced by another unit.

In the first example, describing a multitubular high frequency ozone producting installation comprising three unielement ozonizers coupled by common pipelines, the procedures for dismantling and mounting of said ozonizers for preventive inspection and repair coincide with those described above.

In the second example describing installations comprising seven ozonizing elements in a common housing, the procedure of repair and replacing separate inoperable units is as follows:

First of all, the high voltage supply wire must be disconnected (not shown in FIG. 4). This step is followed by disconnecting the branch pipes 47, 48 from the ring-shaped manifolds 77 which are used for supplying and discharging the water which cools the high voltage electrodes 5. Then the bolts (not shown in FIG. 4) together with washers 73 must be unscrewed off followed by removal of the high voltage unit. After inspection or replacement of the high voltage unit, the ozonizer is reassembled following the same procedure in a reverse order. Thus, the procedure for dismantling and reassembling the ozonizer for preventive inspection and repair is very simple and requires little time, whereas ozonizers haaving a direct flow through cooling of the electrodes require time not only for dismantling the whole installation but also for removing the manifolds and the electrodes. Additionally, the procedure of mounting the ozonizers requires centering of each electrode.

The high frequency ozonizer operates as follows.

Prior to feeding the electric current, a liquid for cooling the electrodes, for example water, is supplied to the ozonizer. The water is fed to the housing of the low voltage electrode directly from the tap water supply through the branch pipe 18 and is discharged through the branch pipe 17. The water is fed to the high voltage electrode through the branch pipe 47 and is discharged from said electrode through the branch pipe 48; The latter branch pipe is connected to long pipe lines made from a dielectric material, provided the electric resistance of the column of water flowing through these pipe lines is high enough to exclude energy losses through water.

Then, oxygen or an oxygen containing gas, is fed to the ozonizer through the branch pipe 32. Having passed in parallel through the ozonizers. The gas to be ozonized is discharged through the common pipe line 65 (FIG. 2). The electric current is then supplied to each ozonizing element separately, provided the increase of voltage is gradual.

The pipelines 60, 61 are made from a dielectric. This feature ensures sufficient electric resistance between the high voltage electrodes of individual ozonizers for disconnecting faulty high voltage ozonizers.

In an ozonizer comprising seven ozonizing elements in one housing, the water cooling the low voltage electrodes is supplied through the common branch pipe 74 and is discharged through the common branch pipe 17. Water for cooling the high voltage electrodes is supplied through the ring-shaped manifold 77 and 78, provided these manifolds are made from a dielectric material.

Oxygen or a gas containing oxygen enters the installation through the branch pipe 32 and is discharged through the branch pipe 21. After that, electric current is fed to each high voltage electrode 5, provided the voltage increase is gradual. As the manifolds 77, 78 are made of a dielectric material, each of the high voltage electrodes can be disconnected in case of a breakdown.

To disassemble the same steps should be taken in reverse order.

Figure 6:
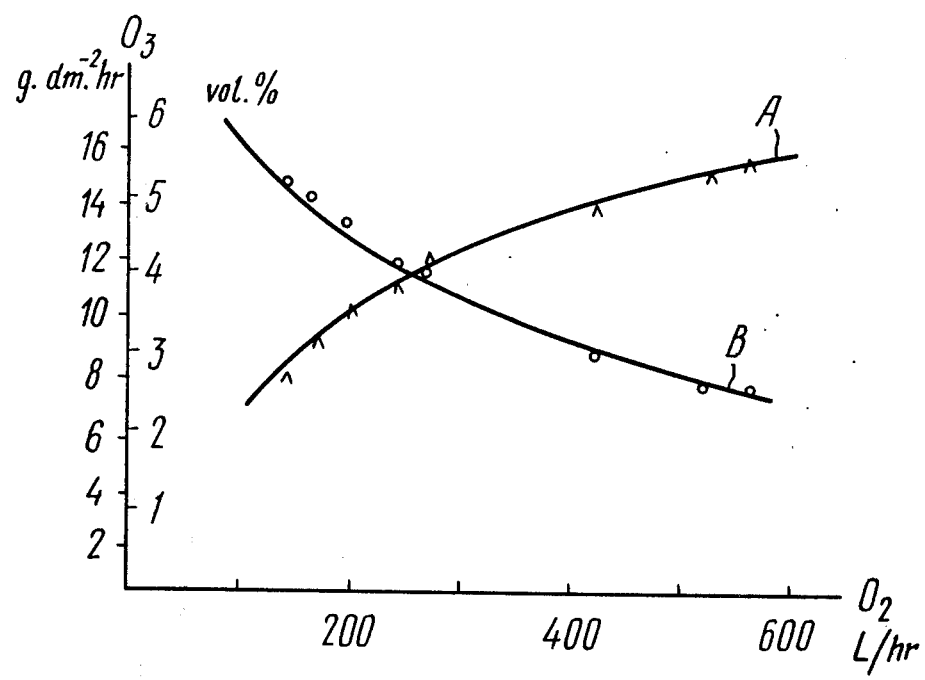
FIG. 6 shows a diagram of output of the ozonizer ($g.dm^{-2}$ $hour^{-1}$) and concentration of produced ozone (volume %) as a function of consumption of oxygen, according to the invention.

An ozonizer comprising only one ozonizing element and having a 2 mm wide discharge gap, and with the temperature of the water cooling the electrodes being 25° C, was operated with alternating current of a frequency of 1500 hz and 6 kW voltage. FIG. 6 shows the output of the ozonizer (curve A) in $g.dm.^{-2} hour^{-1}$ and the concentration of the ozone, produced (curve B) in volume % $O_3$ versus hourly consumption of oxygen. The shapes of the curves show that an increase in oxygen consumption causes an increase in the ozonizer output and a decrease in the ozone concentration. At a comparatively low consumption of gas, the ozone concentration drops to only 2.5% yet the output of the ozonizer is rather high, amounting to 15 $g.dm.^{-2} hour^{-1}$, the power consumption for producing ozone being 8.3 $kwhr.kg^{-1}$.

The illustrated data are not related to the highest possible output of the ozonizer. These data are obtained at a comparatively low consumption of gas, amounting to only 560 l/hr, at which consumption the concentration of ozone produced is rather high and amounts to 2.5%. An increase of gas consumption aimed at a decrease of the concentration of ozone, for example down to 1%, results in a substantial increase of the output of the ozonizer and reduces energy consumption.

In this way, the proposed ozonizer differs from all prior art ozonizers by simplicity of dismantling for repair, high operational reliability, and high output.

A combination of the above features ensures considerable economic efficiency of large-scale high capacity commercial ozone-producing installations.

What is claimed is:

1. A high frequency tubular ozonizer having a metal cylindrical housing with coupling flanges on both sides thereof, said flanges having branch pipes for supplying and discharging a coolant, at least one ozonizing element in said housing and comprising a low voltage tubular electrode cooled with a flow of coolant, a high voltage electrode coaxially disposed in said low voltage electrode and comprising a pipe of two parts, one of said parts being metal and being coated with a dielectric, the other of said parts comprising a metal flow outlet, said tubular parts being arranged to abutt each other; the opposing surfaces of the pipes of the low voltage and the high voltage electrodes forming a discharge gap wherein the ozone-generating chemical reaction takes place at the moment of electric discharge; a metal pipe inside the high voltage electrode and along the axis thereof, said pipe having openings at each end thereof for admitting cooling liquid into the zone of the high voltage electrode and having and end cap with a positioning stop and a clamp at the same end for fastening the high voltage electrode; a hollow cylinder-shaped high voltage insulator for insulation of the high voltage electrode from the low voltage electrode, said insulator having a ring-shaped bead in the middle portion thereof; a metal tubular t-piece for fastening said flow outlet of said high voltage electrode in the zone of said high voltage electrode, said pipe being rigidly fastened to a free opposite end of the t-piece, a branch pipe for supplying the cooling liquid and being rigidly secured to abutt said pipe, in a zone of the pipe of the t-piece there is provided a branch pipe through which the liquid cooling the high voltage electrode is discharged; a cylinder-shaped cup having flanges on both sides thereof for attaching flanges of said cup to said flange of the housing, a cavity in the butt end of said flange of the cup for fastening a branch pipe to supply ozonized gas, the other flange having an opening arranged along the axis of said cup, said opening and said cavity having the shape and dimensions of said bead of the high voltage insulator; a metal cap having an opening along the axis thereof, the shape and dimensions of said opening being those of the bead of said high voltage insulator; the cylindrical metal base rigidly fastened to the free end of said housing having the bottom from one side thereof and a flange from another side thereof, the butt end of said flange having an opening for fastening a branch pipe to discharge the ozonized gas.

2. A high frequency ozonizer as claimed in claim 1 including a device for centering the high voltage electrode along the axis of the low voltage electrode, said device comprising a stop rigidly fixed in the axis of said end cap, a nut fixed on said stop, said stop and said nut being arranged along the axis of said high voltage electrode, a centering journal arranged on the bottom of said base and having a recess along the axis of said low voltage electrode.

3. A high frequency ozonizer as claimed in claim 1 comprising a low voltage electrode having ends with a rounded profile to prevent edge effects and a dielectric break-down.

* * * * *